United States Patent [19]

Kimel

[11] 4,426,790

[45] Jan. 24, 1984

[54] FOLDING RULER ACCESSORY

[76] Inventor: Eugene Kimel, 24, Rte. de la Reine, 92100 Boulogne, France

[21] Appl. No.: 284,682

[22] Filed: Jul. 20, 1981

[30] Foreign Application Priority Data

Jul. 21, 1980 [FR] France ............................... 80 16013

[51] Int. Cl.³ .......................... G01B 3/06; G01B 3/08
[52] U.S. Cl. ........................................ 33/458; 33/161
[58] Field of Search .................. 33/161, 458, 484, 490

[56] References Cited

U.S. PATENT DOCUMENTS

| 763,523 | 6/1904 | Traut et al. | 33/161 |
| 893,035 | 7/1908 | Turner | 33/161 |
| 1,978,887 | 10/1934 | Stowell | 33/458 |

FOREIGN PATENT DOCUMENTS

| 163311 | 9/1905 | Fed. Rep. of Germany | 33/161 |
| 887568 | 8/1953 | Fed. Rep. of Germany | 33/161 |
| 670737 | 12/1929 | France | 33/161 |
| 81323 | 8/1934 | Sweden | 33/458 |
| 241441 | 3/1946 | Switzerland | 33/458 |
| 347362 | 8/1960 | Switzerland | 33/161 |

*Primary Examiner*—Richard R. Stearns
*Attorney, Agent, or Firm*—Sandler & Greenblum

[57] ABSTRACT

An accessory is adapted to be attached to a foldable ruler to enhance the use of a foldable ruler in measuring the distance between two spaced-apart surfaces or elements. The accessory enhances accurate measurement and facilitates precise reading of such measurements. The accessory comprises a sheath and a bar. The sheath includes a lower channel, an upper passageway positioned above the channel, a window opening into the upper passageway, a hairline index provided adjacent to the window and spaced from one end of the sheath by a distance equal to the distance between the axis of the hinged connection of adjacent ruler sections and a free end of one of the sections which is adjacent to the axis. The bar comprises one portion without indicia and one portion having indicia or graduations thereon. A stud can be provided on the bar to engage a groove within the passageway in order to limit the slidable movement of the bar within the passageway. An adjustable screw can be provided in the lower channel in order to secure a section of the foldable ruler to the accessory.

17 Claims, 7 Drawing Figures

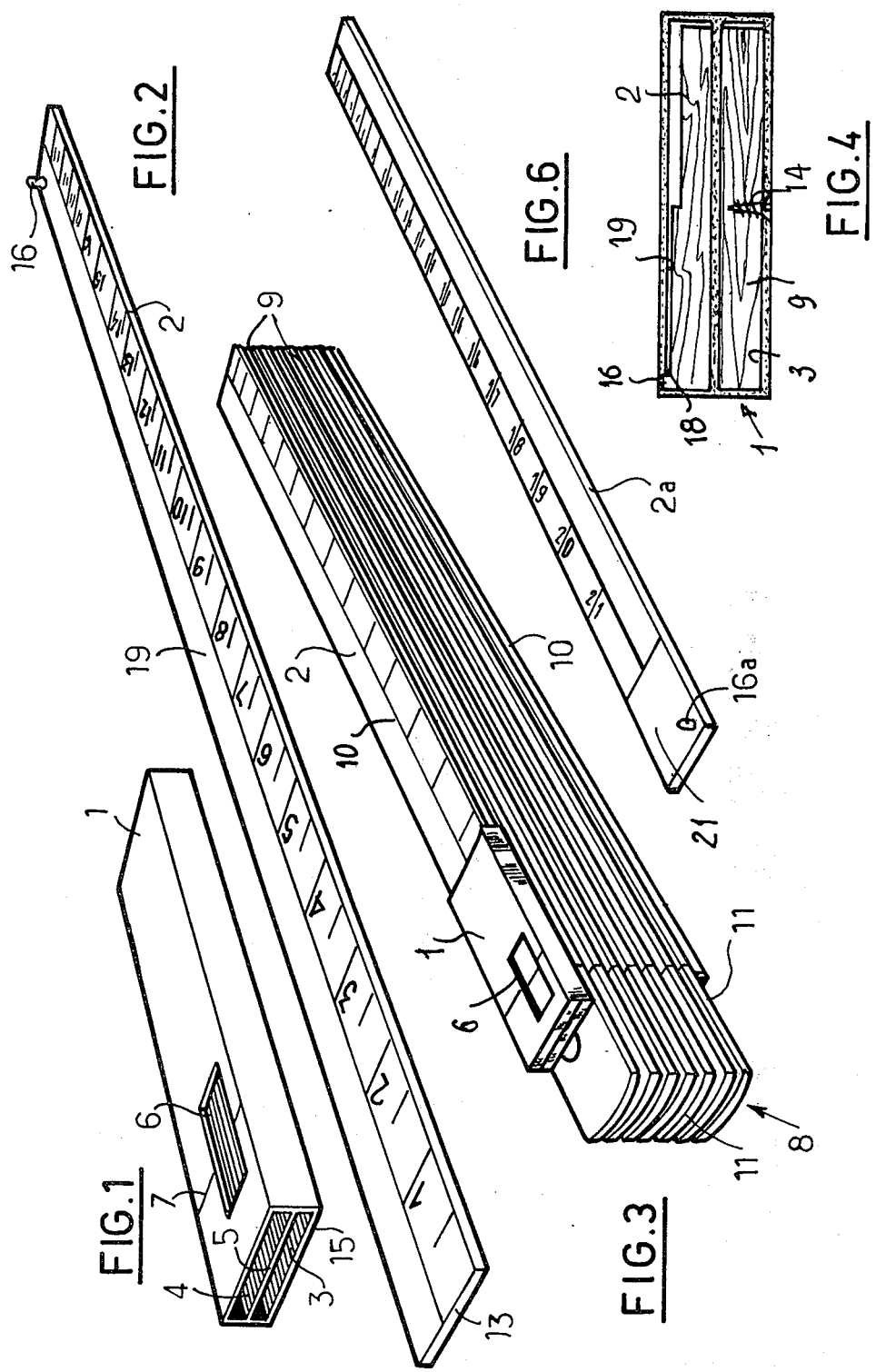

FOLDING RULER ACCESSORY

BACKGROUND OF THE INVENTION

1. Field of the Invention

The present invention generally relates to an accessory adapted to be mounted upon or attached to a folding ruler, and more particularly to an accessory adapted to be mounted on a folding ruler having a plurality of rigid sections with graduations marked thereon. The ruler includes outer sections and intermediate sections hinged to one another adjacent their ends, and the accessory is adapted to be attached to one of the end sections, rather than one of the intermediate sections. The accessory generally comprises a bar and a sheath adapted to hold the bar and retain the end section of the folding ruler to which the accessory is attached.

2. Description of Prior Art

Folding rulers are well known and conventional and generally comprise two end or outer sections and one or more intermediate sections positioned between the outer sections. In one preferred embodiment, the outer sections have lengths of approximately 22 cm., while the intermediate sections have lengths of approximately 24 cm. In practice, the end sections have usable lengths of 22 cm., while the usable portions of the intermediate sections are also 22 cm.; the difference between the usable portion of the intermediate sections and their length is 2 cm., which distance enables hinge pins to be received for hinging adjacent sections to one another. In other words, this is a portion of each section which cannot be used in measuring a distance.

Such rulers make it easy to measure exterior lengths, because when they are unfolded, they are relatively rigid. On the other hand, these rulers are not practical for measuring interior distances and lengths, and are particularly unsuitable for measuring the length of a space located between opposed parts or surfaces, because in most cases such a space does not correspond to a multiple of the length of the sections. In other words, it is difficult to precisely measure an interior distance between two surfaces because the sections come in multiples of a distance, i.e., in the above preferred embodiment, 22 cm., and it is unlikely that a distance being measured could be a precise multiple of 22 cm. Accordingly, it will be necessary to use only a portion of one of the ruler sections and to therefore judge or estimate the precise distance.

One ruler has been proposed to solve this problem, and includes one ruler end section which comprises a longitudinal central groove having a dove-tail cross-section and a graduated, smaller ruler of a corresponding cross-section adapted to slide therein. By this arrangement, spaces can be measured by sliding the small ruler until it butts against one of the portions or surfaces bounding the distance being measured, while the end of the main ruler butts against the other portion or surface.

Such an arrangement, however, is disadvantageous for a number of reasons. The sections must necessarily be formed relatively thick in order to permit the formation of a groove and the insertion of the sliding member into the groove. The smaller ruler must be as thin as possible, while also being sufficiently strong so as to resist twisting and breakage; accordingly, this ruler can only be formed from metal. The use of a small metallic ruler, however, is not advisable in measuring distances in electrical applications. Such a ruler is expensive to manufacture, and not practical in usage. Further, any measurement read from the small ruler must be added to the measurement made from the main ruler, which introduces an additional source of error into any measurement or computation.

SUMMARY OF THE INVENTION

It is, accordingly, an object of the present invention to provide a new and improved accessory adapted to be attached to a folding ruler which overcomes the above-stated disadvantages.

The accessory formed in accordance with the present invention is adapted to be attached to a folding ruler, which ruler comprises two outer sections and a plurality of intermediate sections, each of the sections being hinged to the end of a preceding section. The accessory comprises a sheath adapted to be attached to one of the outer sections of the folding ruler, starting from a predetermined reference position. The accessory also comprises a small bar which can be formed by a section of the folding ruler. The sheath includes an upper passageway or frog in which the small bar is adapted to be slidably mounted, a window opening into the passageway in order to permit reading of a measurement or other indicia on the small bar, and a hairline index to indicate where a reading of the indicia should be made through the window. The hairline index is offset from the end of the sheath by a distance which corresponds to the distance separating the axis of the hinge of two sections from the free ends of the hinged sections which are positioned adjacent to the axis.

By virtue of this arrangement, an accessory or device is provided which is quite simple, which is adapted to be attached to any folding ruler, and which enables direct reading of a desired measurement.

In accordance with one particular embodiment of the invention, the small bar has a length which corresponds to the length of an outer section of a folding ruler.

In accordance with a second embodiment of the present invention, the small bar has a length which corresponds to the length of one of the intermediate sections of the folding ruler.

In order to prevent damage of the graduations or indicia on the small bar while it is sliding through the sheath, a portion of the small bar, which does not have graduations or indicia thereon, is provided with a thickness which is slightly greater than the thickness of the portion of the small bar which has graduations or indicia thereon.

In accordance with another embodiment of the present invention, the upper passageway includes one portion having a relatively narrow cross-section. By virtue of this structure, a conventional, i.e., planar, small bar can be used, and the narrowed portion of the passageway will abut against the portion or surface of the small bar lacking graduations so that the graduations on the other bar portion will not be marred during movement or sliding of the small bar through the sheath.

The accessory can include a stop for restricting or limiting sliding of the small bar. In this fashion, inadvertent sliding of the small bar outwardly from the sheath, and subsequent separation of the elements, can be avoided.

The sheath is preferably provided with means for attaching the sheath to one of the outer sections. The sheath includes at least one hole for adjustably positioning a fixing screw therein.

In accordance with another characteristic of the present invention, the small bar includes an area at one end of the bar which is not provided with graduations or indicia, and which has a length corresponding to the distance separating the hinge axis of two sections from the free end of one of the sections positioned adjacent to the axis.

Briefly, the above and other objects, features, and advantages of the present invention are attained by providing an accessory for a foldable ruler having two outer sections and at least one intermediate section. Each section of the foldable ruler has two ends, and adjacent sections are connected at hinges which are each spaced from a free end of one of the connected sections which is adjacent to the hinge. The accessory comprises a sheath having two ends and which is adapted to be attached to one of the outer sections of the foldable ruler, starting from a reference position. The accessory also includes a small bar having indicia thereon. The sheath comprises an upper passageway in which the small bar is adapted to be slidably mounted, and a window opening into the upper passageway to permit reading of the indicia on the small bar. The sheath also includes a hairline index which is positioned adjacent to the window and which is offset from one end of the sheath by a distance equal to the distance separating the hinge axis of connected adjacent ruler sections from the free end of one of said sections which is positioned adjacent to said axis.

BRIEF DESCRIPTION OF THE DRAWINGS

The above and other objects, features, and advantages of the present invention will become more fully apparent to those of ordinary skill in the art to which this invention pertains from the following detailed description, when considered in connection with the accompanying drawings, in which like reference characters designate like or corresponding parts throughout the several views, and wherein:

FIG. 1 is a perspective view of a portion of a sheath portion of an accessory formed in accordance with the present invention;

FIG. 2 is a perspective view of a small bar forming a portion of the accessory;

FIG. 3 is a perspective view of a foldable ruler having an accessory formed in accordance with the invention attached thereto;

FIG. 4 is a sectional view taken through the accessory formed in accordance with the present invention when it is attached to an outer section of a foldable ruler;

FIG. 6 is a perspective view of a second embodiment of a small bar formed in accordance with the present invention.

DETAILED DESCRIPTION OF THE DRAWINGS

Figure 5:
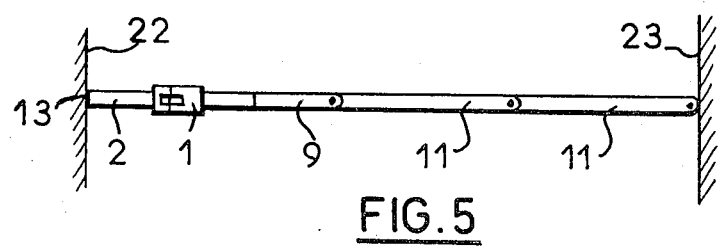
FIG. 5 is a plan view illustrating the use of a foldable ruler having an accessory formed in accordance with the present invention.

More specifically referring to the drawings, the accessory formed in accordance with the present invention comprises a sheath 1, as shown in FIG. 1, and a small bar 2, as shown in FIG. 2. Sheath 1 comprises channel 3 and upper passageway 4, into which a window 6 opens for viewing purposes. A hairline index 7 is positioned on opposite edges of the window, and is spaced from one end of the sheath by a predetermined distance, which is established as discussed in greater detail hereinafter.

A foldable ruler 8 is illustrated in FIG. 3, and comprises a first outer section 9, hinged to an intermediate section 11. Each intermediate section shown is, in turn, hinged to another intermediate section 11. A second outer section 10 is provided, and is hinged to an intermediate section.

In one preferred embodiment of the present invention, the length of each outer section is 22 cm., and the length of each intermediate section is 24 cm. Additionally, although the present invention is described with respect to measurements taken in centimeters, it is equally applicable to measurements taken in any other system of length measurement.

The intermediate sections are hinged together at axes which are 20 cm. apart. This is because of the distance lost in measurement due to the distance between a free end of each of the sections being hinged and the hinge axis between adjacent connected sections. Accordingly, the length of section 9 with the following section, when the rule is folded, is 22 cm. When added to the length of one unfolded section, it is 42 cm., with two sections 62 cm., and so on.

Figure 7:
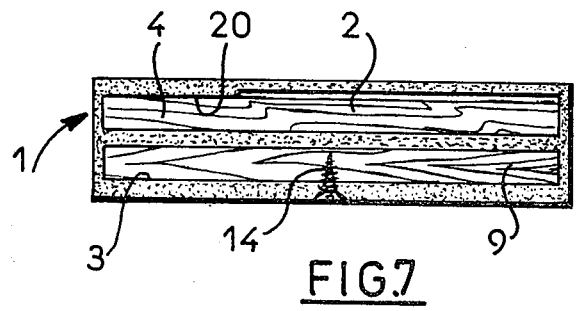
FIG. 7 is a sectional view similar to the sectional view taken in FIG. 4, and illustrates a third embodiment of the present invention.

Sheath 1 is adapted to be mounted on an outer section by engaging the outer section within channel 3, and fixedly securing the section to the sheath by virtue of adjustable screw 14, as shown in FIGS. 4 and 7. In this fashion, a first end 15 of the sheath will be positioned flush with the free end of the outer ruler section. This constitutes the reference position. Small bar 2 is engaged at one end 13 by passageway 4. At the other end of the small bar, a stud 16 is positioned, which restricts the extent of sliding movement of the bar within the sheath by virtue of the fact that it bears against a stop in groove 18 of passageway 4.

In the embodiment shown in FIG. 3, small bar 2 is provided with the same length as outer sections 9 and 10, and hairline index 7 is positioned so that, when end 13 of small bar 2 is situated in a flush manner with the free end of outer section 9, the reference numeral 2 of the graduations or indicia on the small bar will be flush with index hairline 7.

Portion 19 of small bar 2, which is not provided with graduations, is preferably formed slightly thicker than the portion of the small bar having graduations or indicia, so that during sliding of the small bar within passageway 4, the graduations or indicia will not be damaged by rubbing or friction.

In the embodiment illustrated in FIG. 7, the passageway can include an internal protrusion 20 which corresponds in width to portion 19 of the small bar. This provides a narrowed cross-sectional area. In this fashion, a small planar bar can be used which does not vary in width, and which does not include a relatively thick section.

Sheath 1 is preferably formed from plastic material, but can equally well be formed from metal. In the event that the sheath is formed from metal, the walls of channel 3 can include one or more punchings or indentations in order to ensure and enhance locking of section 9 within the channel.

Another embodiment of the invention is illustrated in FIG. 6. In this embodiment, small bar 2 is formed having a reference character 2a, having a length which corresponds to the length of one intermediate section 11, or, in the specific embodiment disclosed above, 24 cm. The small bar, however, is graduated only to 22 cm., an area 21 being provided with a stud 16a in order to restrict sliding movement of the bar within passageway 4 by virtue of the engagement between the stud and groove 18. This is best illustrated in FIG. 4. A small bar is therefore provided which is desirably guided within the passageway.

A ruler provided with an accessory formed in accordance with the present invention is operated as described hereinafter. A ruler provided with such an attachment facilitates measurement between two opposite parts, elements, or surfaces 22 and 23, as best illustrated in FIG. 5. The sections of the ruler are to be used until they extend to as great a distance as possible between the two surfaces, but not so that they protrude beyond it. In other words, if the extension or unfolding of one additional section results in the protrusion of a section beyond one of the surfaces, then this section will not be extended. The sections are unfolded to a length less than that of the space separating parts 22 and 23. Thereafter, small bar 2 slides so that end 13 of the bar butts against surface 22. The hairline index 7 is offset from the end of the sheath by a distance equal to the distance separating the hinge axes from adjacent free ends of the ruler sections, i.e., in this case, 2 cm. The number read from the scale on bar 2 from the hairline index is then added to a multiple of the length of each of the sections: in the example illustrated, 60 cm. (20+20+20). As an example, if reference numeral 6 of bar 2 is positioned adjacent to the hairline index 7, when the length of the three sections is 60 cm., the measurement will be 66 cm. In this fashion, reading is facilitated and very accurate. A practical ruler arrangement is thus provided for precisely measuring between spaced surfaces.

The embodiment of the ruler described above includes intermediate sections having lengths of 24 cm. and outer sections having lengths of 22 cm., but it is equally possible to employ longer or shorter sections.

One additional advantage of the present accessory is that it can be mounted on any type of ruler, including rulers having very thin sections. Dependent upon the length of the passageway 4, it can include advertising material, conversion tables, etc.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A foldable ruler which comprises two outer sections and at least one intermediate section, each of said sections having two ends, and adjacent sections being connected by hinges which are spaced from a free end of said adjacent sections, said hinges being located along two axes, each outer ruler section having a free end substantially coincident with one of said axes, in combination with an accessory comprising:
   (a) a small bar having indicia thereon;
   (b) a sheath adapted to be attached to one of said outer ruler sections, said sheath including two ends and an upper passageway in which said small bar is adapted to be slidably mounted, a window opening to permit reading of said indicia on said bar, and a hairline index positioned adjacent to said window, said hairline index being offset from one end of said sheath by a distance which is equal to the distance separating each hinge axis from the associated free end of one of said intermediate ruler sections, wherein said sheath can be mounted on one outer ruler section so that one end of said sheath will coincide with said free end of said one outer ruler section, said free end of said outer ruler section comprising a reference position.

2. A foldable ruler in accordance with claim 1 wherein said ruler has a plurality of intermediate sections.

3. A foldable ruler in accordance with claim 1 wherein said small bar has a length equivalent to the length of an outer section.

4. A foldable ruler in accordance with claim 1 wherein said small bar has a length equivalent to the length of an intermediate section.

5. A foldable ruler in accordance with claim 1 wherein said small bar includes a portion having indicia thereon and a portion without indicia.

6. A foldable ruler in accordance with claim 5 wherein said portion without indicia is thicker than said portion having indicia.

7. A foldable ruler in accordance with claim 5 wherein said portions are of equal thickness.

8. A foldable ruler in accordance with claim 7 wherein said passageway has a relatively narrow portion and a relatively wide portion, said portion of said bar without indicia being positioned adjacent to said relatively narrow portion of said passageway.

9. A foldable ruler in accordance with claim 1 wherein said bar includes a stud and said sheath includes a groove, said stud and groove adapted to engage each other upon movement of said bar to limit the slidable movement thereof.

10. A foldable ruler in accordance with claim 1 wherein said sheath comprises means for attaching said accessory to said foldable ruler.

11. A foldable ruler in accordance with claim 10 wherein said attachment means comprises a channel below said passageway.

12. A foldable ruler in accordance with claim 11 further comprising an aperture in a wall of said channel and a screw adjustably threaded within said aperture to secure a section of said ruler therein.

13. A foldable ruler in accordance with claim 1 wherein said bar comprises an area without indicia, said area having a length equal to the distance between a hinge axis between adjacent ruler sections and the free end of one of said sections which is positioned adjacent to said hinge.

14. A foldable ruler in accordance with claim 1 wherein said hairline index includes portions located on opposed sides of said window.

15. A foldable ruler in accordance with claim 1 wherein said sheath further comprises a channel separated from said passageway by a partition.

16. A foldable ruler in accordance with claim 15 wherein said one sheath end is adapted to be flush with a free end of an outer ruler section when the sheath and ruler are attached.

17. An accessory in accordance with claim 1 in combination with said ruler.

* * * * *